United States Patent [19]
Hupf et al.

[11] Patent Number: 6,004,000
[45] Date of Patent: Dec. 21, 1999

[54] TEMPERATURE INDICATING DEVICE FOR A COOKING VESSEL

[75] Inventors: Charles J. Hupf, Cascade; Karlis Arijis Smaga, Hartford, both of Wis.

[73] Assignee: Regal Ware, Inc., Kewaskum, Wis.

[21] Appl. No.: 08/943,947

[22] Filed: Oct. 3, 1997

Related U.S. Application Data

[60] Provisional application No. 60/027,596, Oct. 4, 1996.

[51] Int. Cl.⁶ .................................................... G01D 11/28
[52] U.S. Cl. .............................. 362/26; 99/343; 116/70; 362/154
[58] Field of Search ................................ 116/70; 362/26, 362/27, 32, 92, 154, 234, 253; 99/338, 343

[56] References Cited

U.S. PATENT DOCUMENTS

| | | | |
|---|---|---|---|
| 2,254,570 | 9/1941 | Hailey | 99/343 |
| 4,418,637 | 12/1983 | Heermans | 116/70 |
| 4,776,296 | 10/1988 | Heermans | 116/70 |
| 5,265,522 | 11/1993 | Schultz | 99/343 |

*Primary Examiner*—Stephen Husar
*Attorney, Agent, or Firm*—Ryan Kromholz & Manion, S.C.

[57] ABSTRACT

A temperature indicating apparatus for a cooking vessel, the apparatus having a housing having at least one opening, a template, a light directing mechanism, and a temperature sensing mechanism. The template being positioned generally in alignment with the opening. The light directing mechanism having a light radiating structure positioned to illuminate the template. The template being moveably coupled to the temperature sensing mechanism. The light directing mechanism being coupled to the housing. A process for monitoring the temperature of a cooking vessel including a temperature indicating apparatus for a cooking vessel, the apparatus having a housing having at least one opening, a template or translucent panel or both, a light directing mechanism, and a temperature sensing mechanism is also described.

15 Claims, 9 Drawing Sheets

FIG. 2 (OLD ART)

TEMPERATURE INDICATING DEVICE FOR A COOKING VESSEL

This application claims benefit of provisional application Ser. No. 60/027,596 filed Oct. 4, 1996.

BACKGROUND OF THE INVENTION

The present invention relates generally to the field of cooking and more specifically to the use of accessory or integral devices which may be used to indicate the general temperature of the cooking vessel or the temperature of the material or food within the cooking vessel. Further, the present invention is believed to have particular application in the field of "Waterless" cooking especially in conjunction with devices which provide an audible signal.

"Waterless" cooking is old, as are knobs which give an audible signal when steam is formed to indicate attainment of cooking temperatures. Knobs for cooking vessels which are provided with whistles and having mechanisms to turn the whistle off or to allow the escape of steam are also known. Additionally, knobs with temperature indicating devices are also known. However, there is no system available to closely monitor the changes of temperature inside the cooking vessel, and to provide a combination of auditory and visual signals. While a whistling device may alert a cook when the temperature is high enough to start cooking, it offers no means to observe the variation of temperature inside the vessel during the cooking process. Cooking vessels retain a considerable amount of heat and it is desirable for the cook to have a visual reference to control the temperature inside the vessel. This is especially desirable where the cook may be hearing impaired or where the cook is engaging in "Waterless" cooking. Further, there is no teaching in the prior art of a structure for a cooking vessel that may be illuminated to enhance visual recognition of information, like temperature of the cooking vessel, for the user of the cooking vessel.

Accordingly, it is a goal of the present invention to provide both a structure and a method for supplying information about the temperature of the cooking vessel and the food in the cooking vessel in a visual manner.

It is a further goal of the present invention to provide a structure and method which relies on the use of light from a light source, traveling through a light tube or equivalent structure, to provide information to the user of the cooking vessel.

It is a further goal of the present invention to provide a structure and/or a method which may be used to illuminate the template or translucent panel or both to convey information regarding the temperature or cooking status of the cooking vessel or the material contained within the cooking vessel.

It is a further goal of the present invention to provide a structure and method which relies upon the use of both audible signals and visual signals to convey information regarding the temperature or cooking status of the cooking vessel or the material contained within the cooking vessel.

SUMMARY OF THE INVENTION

The present invention may be generally described as an illuminated accessory for a cooking vessel including a housing having at least one opening and an illumination means. The illumination means is coupled to the housing in such a manner as to permit the illumination means to illuminate the opening in the housing.

The present invention also frequently includes a temperature sensing element positioned between the opening and the illumination means. The temperature sensing element is intended for and is capable of indicating the temperature of the cooking vessel to which the illuminated accessory is mounted. Light from the illumination means improves the viewability of the temperature sensing element, making it easier to see through the opening in the housing.

The primary function of the illumination means is to improve the viewability of the temperature sensing element. The important requirement is that the illumination means provide sufficient light to fulfill this function. One structure designed to provide the requisite light is a light pipe disposed within the housing. The light pipe receives light through at least one opening in the housing and conducts this light by way of internal reflection to at least one other opening in the housing, the latter opening being the opening through which the temperature sensing element may be viewed. The light pipe may be fashioned from fiber optic material, acrylic material, polycarbonate material, or glass material.

Another illumination means intended to provide the requisite light is an electrically activated light source such as a light emitting diode or a light bulb mounted within the housing such that the opening through which the temperature sensing element is viewable is illuminated. The power needed to operate the light emitting diode or light bulb is provided by a plurality of solar collectors mounted on the housing.

Yet another illumination means includes a plurality of reflecting devices, e.g. mirrors, arranged within the housing about one or more openings in the housing so as to reflect the light entering the one or more openings to the opening in the housing through which the temperature sensing element is viewable.

The temperature sensing element is comprised of a heat sink, a bimetallic coil, and a substantially transparent template having means to indicate temperature printed thereon. The heat sink is embedded in the housing and is thermally coupled between the cooking vessel upon which the illuminated accessory is mounted and the bimetallic coil. The bimetallic coil is also mounted upon the heat sink. Heat conducted from the cooking vessel to the bimetallic coil makes the coil rotationally deflect. The magnitude of deflection of the bimetallic coil is know as a function of the temperature of the cooking vessel. The template is connected to the bimetallic coil such that the template rotates as a direct result of the rotational deflection of the coil. The rotation of the template brings the indicating means printed upon the template into position between the illumination means and the opening in the housing so as to relate to a user of the cooking vessel the temperature of the cooking vessel. The illumination means illuminates the template of the temperature sensing element, making it easier to see the template.

Another embodiment of the temperature sensing element requires a heat sink thermally coupled between the cooking vessel and a bimetallic coil, with the bimetallic coil also being mounted upon the heat sink. In this embodiment the indicating means are printed upon a transparent film that is affixed over an opening in the housing of the accessory. A pointer is coupled to the bimetallic coil in such a way that the rotational deflections of the coil cause the pointer to move across the opening having the indicating means affixed thereover. The pointer, driven by the bimetallic coil, indicates, by pointing to particular portions of the indicating means, the temperature of the cooking vessel. The pointer is illuminated by the illumination means as the path the pointer travels is between the illumination means and the opening having the indicating means.

It is also intended that the accessory described herein may be configured to replace existing accessories for cooking vessels that do not incorporate an illumination means as also described herein.

It is also contemplated that prior art audible signal valve knobs for cooking vessels may be improved by incorporating therein illumination means and a temperature sensing element. In such an improved audible signal valve knob, an illumination means would be coupled to the housing of the knob so as to illuminate an opening in the housing. A temperature sensing element would be interposed between the opening and the illumination means so as to indicate the temperature of the cooking vessel upon which the knob is mounted. The temperature sensing element would be visible through the opening in the knob. The illumination means and the temperature sensing element described above, and their respective variations, are also suitable for use with an audible signal valve knob. Such an improved knob may also be configured for use as a replacement for prior art knobs not incorporating an illumination means or temperature sensing element.

It is also contemplated that a prior art audible signal valve knob for use with a cooking vessel might be improved by incorporating therein a temperature sensing element for indicating the temperature of the cooking vessel upon which the audible signal valve knob is mounted. The temperature sensing element and its variations described above are suitable for incorporation into a prior art audible signal valve knob. As is the case above, an improved audible signal valve knob incorporating the temperature sensing element may be configured to replace prior art knobs not incorporating a temperature sensing element.

The basic method of cooking using a cooking vessel having a temperature indicating device or apparatus is relatively simple. Heat is applied to a cooking vessel having an audible signal valve knob incorporating a temperature indicating device or apparatus or a knob for a cooking vessel comprising only a temperature indicating device or apparatus. The temperature indicating device and more particularly, the temperature sensing element, is observed to determine the temperature of the cooking vessel and its contents. The heat being applied to the cooking vessel is reduced or increased according to the observed temperature of the cooking vessel as derived from the temperature sensing element of the temperature indicating device.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

It should be emphasized that the present invention 100 which is disclosed herein may be used in a variety of different ways with various cooking vessel structures including use as a separate add on device, a device integral to the structure of a cooking vessel, and as an interchangeable component with a cooking vessel. The use of the present invention 100 is not to be limited by the specific disclosure herein.

Figure 2:
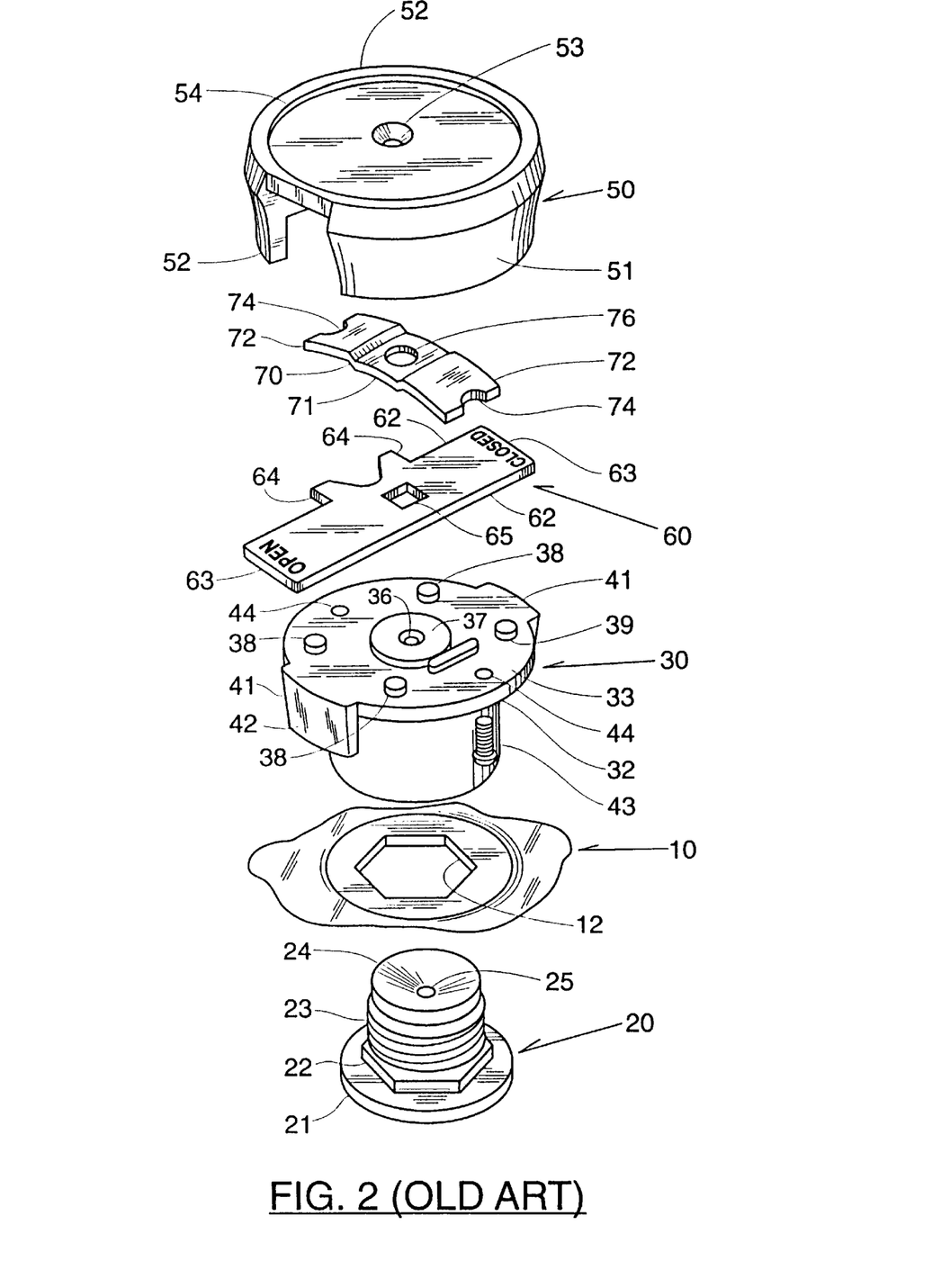
FIG. 2 is an exploded view of a prior art audible signal valve.

First, referring to FIG. 2, a prior art audible signal valve which the present invention 100 may be used in combination with is disclosed and described. The top of a cooking vessel 10 is provided with a non-circular opening 12 to which the various parts of the knob of the present invention are mounted. This consists of an inner knob or knob base 20, an outer knob 30, a knob cover 50, a valve slide 60, and a leaf spring 70.

The knob base, or inner knob 20 consists of a lower flange 21, a hexagonal portion 22 to complementarily fit the opening 12 in the vessel 10, which could be any appropriate, preferably non-circular, shape, a threaded portion 23 and lower resonance chamber portion 24 surrounding a whistle orifice 25 having a form suited to generate a tone when a vapor passes through it.

Outer knob 30 consists of an inner skirt 31 adapted to screw on to threaded portion 23 of the lower knob, an outer skirt 32 which bears on the vessel 10 when outer knob portion 30 is screwed into place, a horizontal valve supporting surface 33, resonance chamber side wall 34 and resonance chamber upper wall 35, in the center of the resonance chamber upper wall a second whistle orifice 36 directly above the first orifice 25 in the assembled position, an orifice-surrounding boss 37, slide stop abutments 38, slide guide abutments 39 and guide bar abutment 40. At diametrically opposite portions of valve supporting surface 33, the outer knob 30 is provided with slight projections 31, each provided with a depending tab 42 which underlies the slide valve path and becomes part of the knob cover 50, which aligns it for non-rotatable assembly by means of screws 43. The knob cover 50 is provided with a depending skirt 51 extending entirely around the knob and enclosing it with the exception of relieved portions 52 the size of depending tabs 42 of the upper knob, so that when the knob cover 50 is placed onto the upper knob body it is automatically aligned to receive screws 43 which secure the upper knob body to the knob cover 50 through holes 44. Knob cover 50 has an orifice 53 in the center of the upper wall 54 and aligned with orifices 25 and 36. Knob cover 50 also has studs 55 (not shown) depending from the underside of its upper wall 54 within the margin of skirt 51 to receive screws 43 and to assist in locating leaf spring 70. Relieved portions 52 in skirt 51, in addition to forming keys to receive tabs 42 for non-rotatable alignment, also serve in their upper portions as part of the valve slide path. Ends of the valve slide means 60 project therefrom so that they may be manipulated, as will be described later.

Valve slide 60 rests on boss 37 and is moveable along a valve slide means path extending from one surface extension 41 to the opposite projection 41 between slide stop abutments 38 and slide guide abutments 39 and guide bar abutment 40, along a chord of the knob, preferably a diameter.

Valve slide means 60 consists of an asymmetric valve member having a pair of long sides 62 and a pair of ends 63. One of the long sides 62 is provided with a pair of sidewardly extending abutments 64 which are spaced apart a distance along the slide valve path which is sufficiently less than the distance between the slide stop abutments 38, in the same direction to permit whistle orifice 65 to be moved in the direction of the valve slide path to a first position over orifice 36 and to a second position completely unaligned with orifice 36. For that purpose, it is preferable that orifice 65 not be in the exact center of rectangular body 61 but be spaced slightly from the center in the direction parallel to long sides 62 and to the valve slide path.

Leaf spring 70 is a generally rectangular member made of any suitably resilient and heat resistant material such as spring stainless steel. It has a depressed central portion 71, a raised wing 72 at each end, forked ends 74 in each wing to locate spring 70 between the studs 55 depending from knob cover 50, and a central orifice 76 positioned coaxially of orifices 25, 36, and 53 when the knob is assembled. The leaf spring 70 biases valve slide means 60 away from upper wall 54 into engagement with boss 37, so that the valve slide 60 is always biased into good contact with the boss 37 and provides an effective seal, whether the valve is opened or closed. The exact amount of bias can be varied by changing the dimensions or material of leaf spring 70; the bias should be sufficient to create a seal and maintain the selected position of slide 60, but not so great as to distort the valve slide 60 or prevent the slide 60 from being operated to open or close the valve.

Thus, in the present embodiment valve means are defined by valve supporting surface 33, whistle orifice 36, boss 37, valve slide means 60 and the parts 62–65 thereof, and leaf spring 70 bearing between upper wall 54 and valve slide means 60. These parts cooperate together to regulate the flow of a fluid such as air between whistle orifice 36 and the exterior of the knob according to the position of valve slide means 60 in the previously defined valve slide path.

When the present knob is assembled as shown in FIG. 2, one of the ends 63 of valve slide means 60 will project through one of the relieved portions 52 in knob cover 50 and will preferably bear a legend indicating whether the valve is open or closed. It may be slide along the valve path by finger pressure on the exposed end 63 to push that end flush with knob skirt 51 and expose the other end 63, thereby opening or closing the valve. The valve construction described is simply made, readily cleaned and reassembled and keeps the fingers of the user away from escaping steam, unlike earlier structures.

As a whistle, the knob presents a series of orifices 25, 36, 65, 76, and 53 separated by a resonance chamber consisting of a lower resonance chamber 24 in the knob base 20, and resonance chamber side wall 34 and resonance chamber wall 35 in the outer knob 30, which form a very effective whistle. The remaining three orifices are not a part of the whistle, as such, but provide a valve end and escape path respectively. When food is being heated in vessel 10, a temperature is reached at which substantial quantities of water vapor are generated and rushed through orifices 25 and 36 and the intervening resonance chamber, creating a whistling sound to warn the cook that the temperature should now be reduced for effective waterless cooking. The valve slide 60 is then moved from the open position to its closed position in which orifice 65 is displaced with respect to orifice 36, by pushing on the projecting end 63 of the valve slide 60 which is at the left in FIG. 5 until the other abutment 64 strikes the corresponding slide stop abutment 38. The top of vessel 10 in which the knob is located is now completely sealed and will retain the vapor within the pan to seal in the flavors and moisture. This method of cooking is well-known.

However, the presence of the whistle orifices and resonance chamber in the present knob offer the possibility of contamination by volatile food substances, or even, if the conditions are wrong, by solids passing through orifice 25. In any case, it is desirable to be able to attain complete cleanliness in the knob. By removing the entire outer knob 30, leaf spring 70, slide 60, and knob cover 50, by unscrewing them from knob base 20, the knob may be removed from vessel 10. It will be noted that although pressure can be applied only to knob cover 50, the reliefs 52 serve to prevent relative rotation, as do screws 43, and apply the pressure to tabs 42 of the upper knob body, carrying it along as the cover 50 is rotated. Because opening 12 is preferably non-circular, and because the complementary (non-circular) hexagonal portion 22 of the lower knob body fits within it, it is easy to turn the upper portion while the lower portion remains stationary. The only remaining step to completely disassemble the knob, if that is necessary, is to remove the two screws 43. These have been exposed once the outer parts of the knobs are removed, but are concealed by insulative plastic when the knob is assembled.

From a consideration of FIG. 2 it will be seen that the valve slide 60 can only be placed on the outer knob 30 in a functional position with the words visible and the abutment 64 disposed adjacent and between slide stop abutments 38 to limit the travel of valve slide means 60 as indicated previously. Stops 38 have a space between them to receive abutment 64 but because of guide bar abutment 40 there is no comparable space between slide guide abutments 39. When the slide 60 and leaf spring 70 are in place on outer knob 30, knob cover 50 is placed over them, being guided by tabs 42 and reliefs 52 into position so that screws 43 are perfectly aligned for insertion. With screws 43 in place, the entire outer part of the knob is unitary. The knob base 20 may then be inserted in vessel 10 through opening 12 and the outer knob parts screwed on to threads 23, whereupon skirt 32 bears on vessel 10 above flange 21 to give a very secure anchorage.

Figure 1:
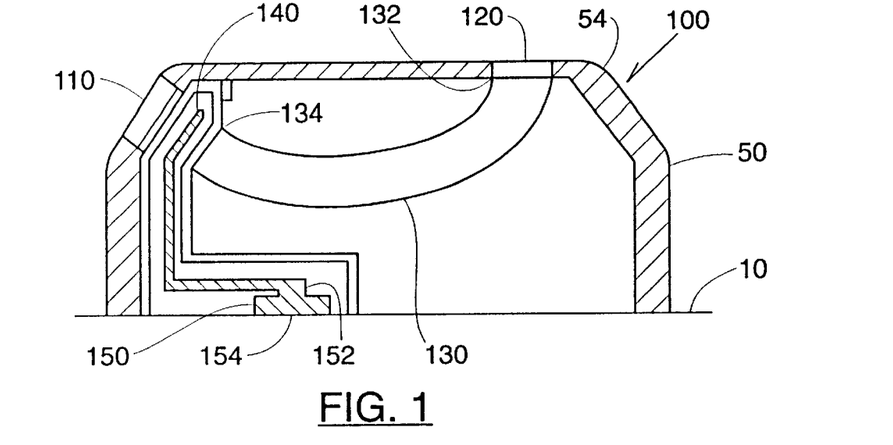
FIG. 1 is a cross-sectional view of the present invention showing the light tube and heat sensing structures.
Figure 2A:
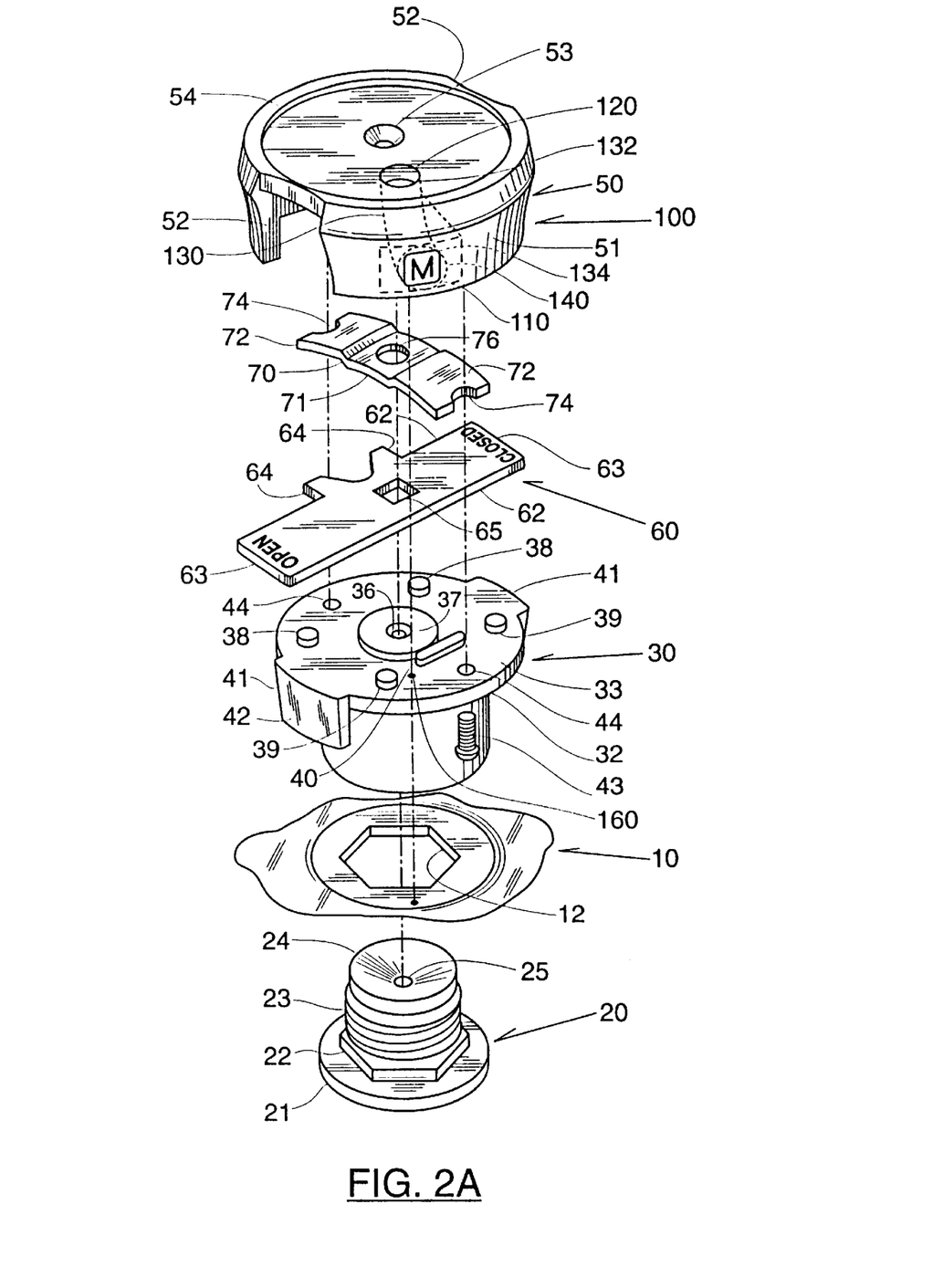
FIG. 2A is an exploded view of the prior art audible signal valve showing the present invention incorporated into its structure.

The improvement of the present invention, a temperature-indicating device, herein referred to as 100, is shown in FIGS. 2A and 3 through 14. Referring to FIGS. 1 and 2A, the outer knob 30 further includes an opening 160. The opening 160 is situated between the hole 44 and the slide guide abutment 39. The knob cover 50 further includes a first opening 120, located in the upper wall 54 of the knob cover 50, and a second opening 110 formed in the depending skirt 51. The device 100 includes a light tube 130 having one end 132 arranged to be received in the opening 120 of the knob cover 50, and the other end 134 located adjacent to the opening 110.

After passing through opening 120, the light tube 130 extends arcuately toward the depending skirt 51 in the direction of the opening 110. The light tube 130 is positioned inside the knob cover 50 in a space defined by the skirt 51, the upper wall 54, the valve slide 60, and the outer knob 30. The positioning of the light tube 130 offers good light reception and does not interfere with the movement of the valve slide 60.

The device 100 further includes a template 140 located adjacent to the skirt 51 and to the opening 110. Preferably, the template 140 has a rectangular shape, but could be of any appropriate shape. The template 140 is interposed between the end 134 of the light tube 130 and the opening 110. The template 140 incorporates the letters L, M, and H, which face the opening 110 of the knob cover 50 and correspond to low, medium, or high temperatures in the cooking vessel 10, respectively. The template 140 may be designed to communicate any type of information desired such as a message or a temperature. The template 140 is moveably coupled to a temperature sensing element 150 able to move inside the knob cover 50. The temperature sensing element 150 preferably consists of a bimetallic coil, sensing to temperature variations, having one end 152 moveably coupled to the template 140 and the other end 154 extending through the opening 160 in the outer knob 30 and coupled to the top of the cooking vessel 10.

In the present embodiment, the improvement of the present invention provides an additional means for indicating the temperature inside a cooking vessel besides the well-known audible signal. When food is being heated in a vessel having a lid 10, the temperature sensing element 150 senses the variation of temperature inside the cooking vessel cover 10, activating the template 140. The temperature variation of the cooking vessel cover 10 is directly related to the temperature variation within the cooking vessel. The movement of the template 140 is calculated to bring the letter corresponding to the temperature, or any other message relating to it, adjacent to the opening 110 of the knob cover 50. The light rays enter the light tube 130 through the opening 120 in the upper wall 54 and travel toward the end 134, projecting a focused light beam on the surface of the template 140. Because the template 140 is generally transparent, the letter or the message is illuminated and will be visible from the outside through the opening 110. The cook will know at any time the temperature inside the cooking vessel 10.

Figure 3:
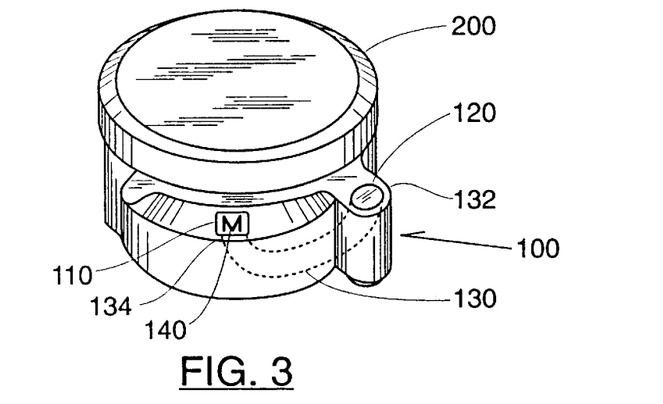
FIG. 3 is a perspective view of the present invention as a separate add on structure for use with a knob for a cooking vessel.

Referring now to FIG. 3 the present invention 100 may seen used in conjunction with a standard knob 200 for a cooking vessel. In this embodiment the invention 100 is shown mounted to the side of the knob 200. The invention 100 may be integral to the knob 200 or may be an add on feature designed to be coupled to the knob 200.

Figure 4:
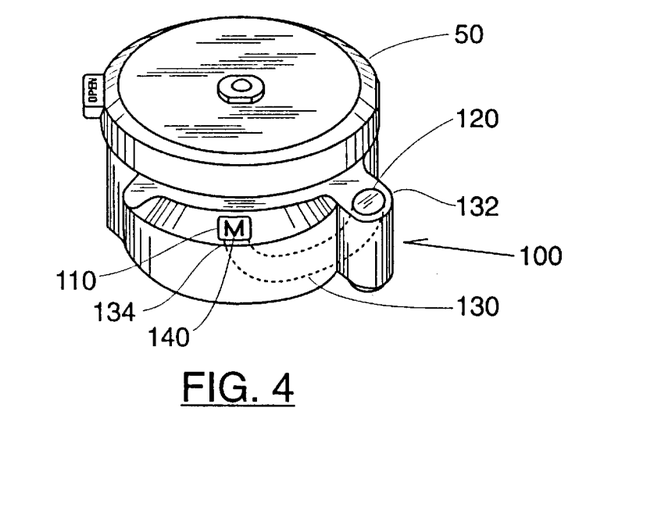
FIG. 4 is a perspective view of an alternative structure of the present invention for use as a separate add on structure for use with an audible signal valve knob for a cooking vessel.
Figure 5:
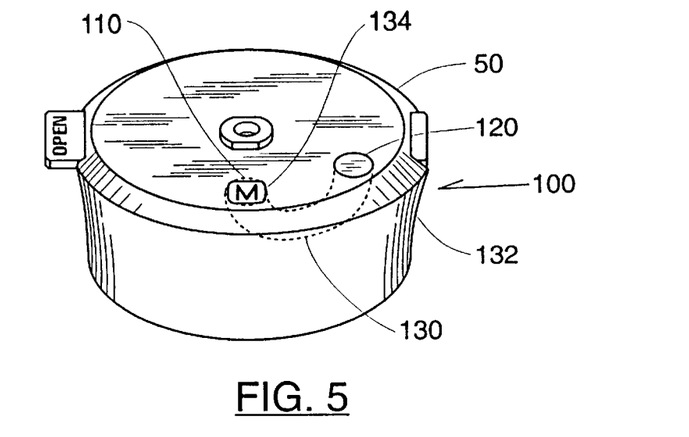
FIG. 5 illustrates another alternative structure of the present invention showing the present invention integral to an audible signal valve knob. However, it should be noted that the structure of the present invention could also be made integral to the knob of a standard cooking vessel.
Figure 6:
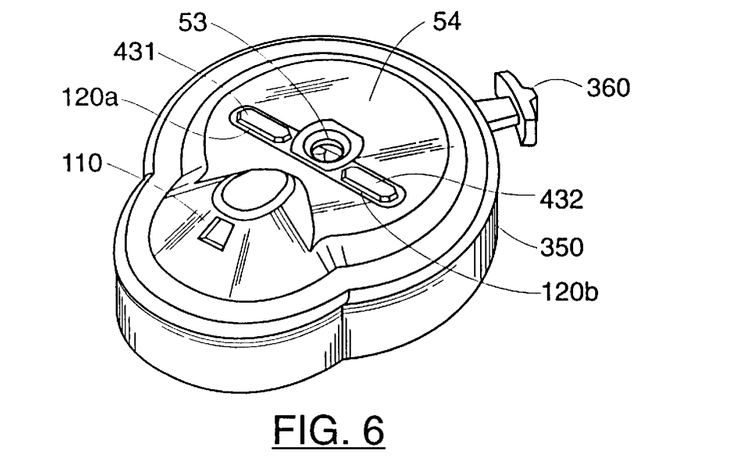
FIG. 6 is a top perspective view of an alternate embodiment of the temperature indicating device.

Referring now to FIGS. 4 and 5 the present invention may be seen in two alternative embodiments for use with an audible signal valve knob 50. Again the present invention may be used either as an integral component of the knob 50 or as an add on feature designed to be coupled to the knob 50.

It should also be noted that the light tube 130 may be made out of any material that may sufficiently conduct light. Such materials include fiber optic strands and/or light conducting acrylics, for example, a General Electric Plastics light conducting acrylic. However, the presently preferred material for the light tube is a light conducting acrylic which may be bent or shaped mechanically upon heating the material to a temperature of approximately 100 degrees Fahrenheit. However, given the fact that the present invention 100 may be used on cooking vessels of a variety of configuration it should be understood that other light conducting materials, e.g., LEXAN or other polycarbonates or glass or other materials, having a higher range of heat resistance to deformation may be used.

A preferred embodiment of the temperature indicating device 100 has been adapted to be incorporated within a knob for a cover of a cooking vessel 10 that may embody means for producing an audible signal and for waterless cooking or their equivalents such as the means described in the U.S. Pat. No. 4,418,637, hereby incorporated by reference. This preferred embodiment of the temperature indicating device 100 may likewise be incorporated into a knob not provided with waterless cooking means.

The housing of the knob, including waterless cooking means as indicated above and as illustrated in FIGS. 6 through 14, is comprised of a modified outer knob 330 removably coupled to a modified knob cover 350. The outer knob 330 and the knob cover 350 are secured to a cover 10 for a cooking vessel by a standard knob base 20, similar to the knob base 20 of U.S. Pat. No. 4,418,637. By utilizing the prior art knob base design, the improved knob incorporating the temperature indicating device 100 can replace existing knobs already in use that do not have the temperature indicating device 100, in addition to being included as original equipment on new cooking vessel covers 10.

Figure 7:
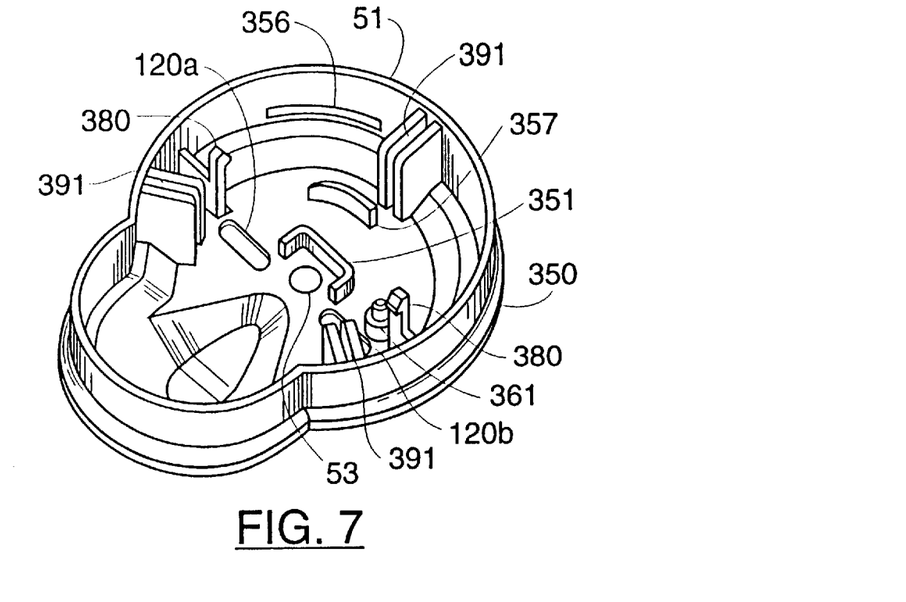
FIG. 7 is a bottom perspective view of the underside of the alternate embodiment of FIG. 6.
Figure 8:
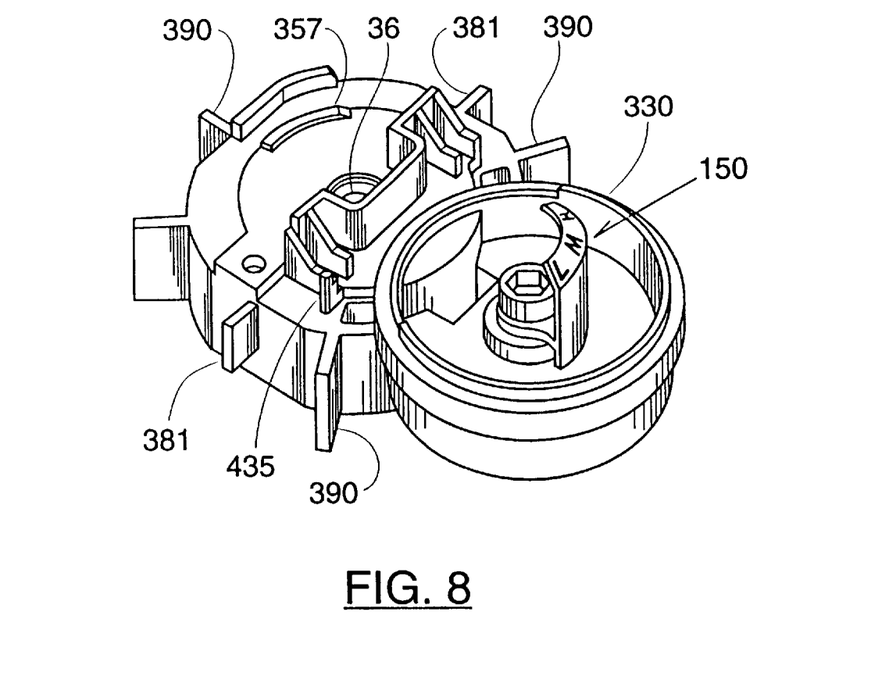
FIG. 8 is a top perspective view of the alternate embodiment with the cover removed.
Figure 9:
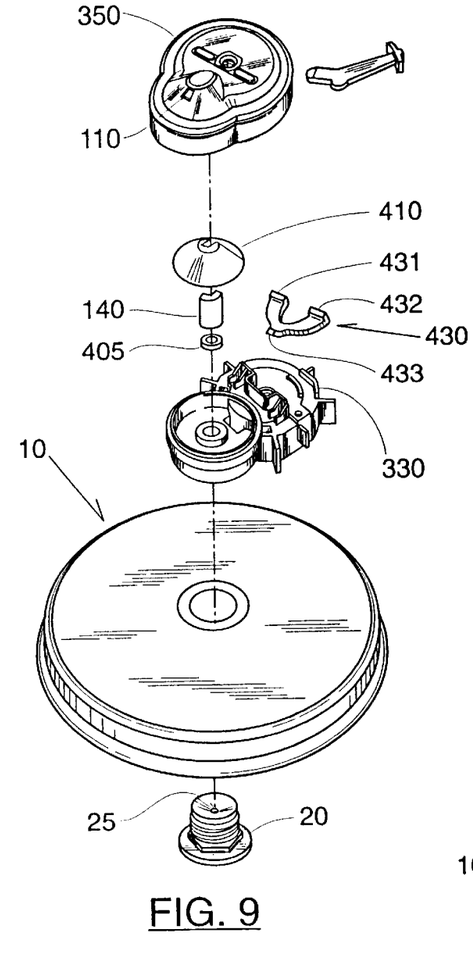
FIG. 9 is an exploded view of the temperature indicating device showing the alternate version of the invention incorporated into its cooperating structure.

As can be seen in FIG. 9, the knob base 20 threadedly mates with the outer knob 330, thereby capturing the cover 10 between the knob base 20 and the outer knob 330, securing the outer knob 330 to the cover 10 of the cooking vessel, and completing the resonance chamber above the whistle orifice 25. The resonance chamber and the whistle orifice 25 are the means whereby the knob can generate an audible tone. An audible tone is generated when steam exits the cooking vessel 10 through the whistle orifice 25 of the knob base 20, the second whistle orifice 36 of the outer knob 330 (FIG. 8), and finally through orifice 53 of the knob cover 350 (FIG. 7). The whistle orifice 25 the second whistle orifice 36, and the orifice 53 in the knob cover 350 are concentric with each other.

To hold the knob cover 350 to the outer knob 330, the knob cover 350 is provided with a pair of clips 380 (FIG. 7) that mate with a pair of latches 381 (FIG. 8) formed into the outer knob 330. Alternatively, screws may be used which pass through apertures formed in cover 350 and threadedly engaged into bosses formed in outer knob 330. As the knob cover 350 is generally attached to the outer knob 330 before the outer knob 330 is threadedly mated to the knob base 20, the outer knob 330 has been provided with three ribs 390 that radially extend outwardly from body of the outer knob 330. The ribs 390 are arranged to be received by three slots 391, formed from three pairs of parallel ribs, each similar to ribs 390, extending radially inwardly from the inner surface of the depending skirt 51 of the knob cover 350. When the knob cover 350 is secured to the outer knob 330 by the clips 380, the ribs 390 are received by slots 391, thereby providing a means to resist the torque that is applied when the knob base 20 is screwed into the outer knob 330 and preventing the clips 380 from being broken in the assembly operation. The clips 380 are designed to be releasable so that the knob cover 350 can be disassembled from the outer knob 330 if so desired.

In addition to means for generating an audible tone, means for engaging in waterless cooking are also provided in the present invention. In order to facilitate waterless cooking, a cantilever slide 360 (FIGS. 6 and 10) is provided within the knob cover 350 so as permit the closure of the second whistle orifice 36 when the contents of the cooking vessel have reached a desired temperature. The cantilever slide 360 is intended to function in the same manner as slide 60 (FIGS. 2 and 2A), described above. The cantilever slide 360 pivots freely about a pin 361 (FIG. 7), formed into the underside of the knob cover 350. The slide 360 extends from the pin 361 through a slot 356 in the depending skirt 51 of the knob cover 350 and terminates in a control surface 362 for manipulating the slide 360. The slide 360 is shaped in a dogleg fashion such that a protuberance 363 (FIG. 10) extending from the bent portion of the slide 360 will cover the second whistle orifice 36 in an airtight fashion when the slide 360 is in a first closed position, and will leave the second whistle orifice 36 open when the slide is in a second, open position. In order to aid the formation of an airtight seal between slide 360 and the second whistle orifice 36, the knob cover 350 and the outer knob 330 are provided with a series of cooperating wedges 357 (FIGS. 7 and 8) that impinge upon the sides of the slide 360 and bias it so that the protuberance 363 comes into sealing contact with the second whistle orifice 36 when the slide 360 is in a closed position. The slide 360 is opened or closed in accordance to the well known principles of waterless cooking.

Figure 11:
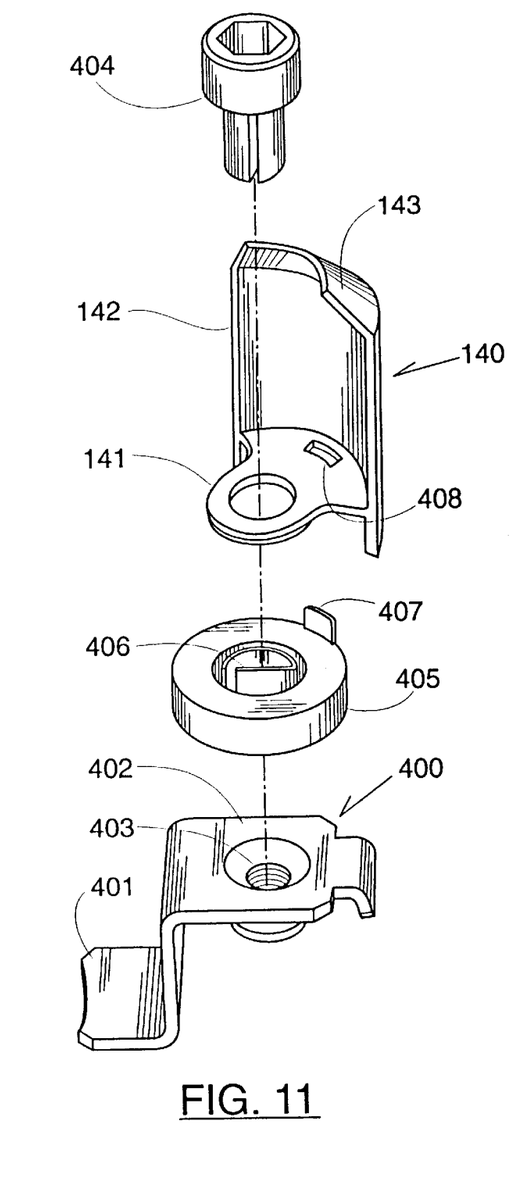
FIG. 11 is an exploded view of an improved temperature indicating device having particular application to the alternate embodiment.
Figure 12:
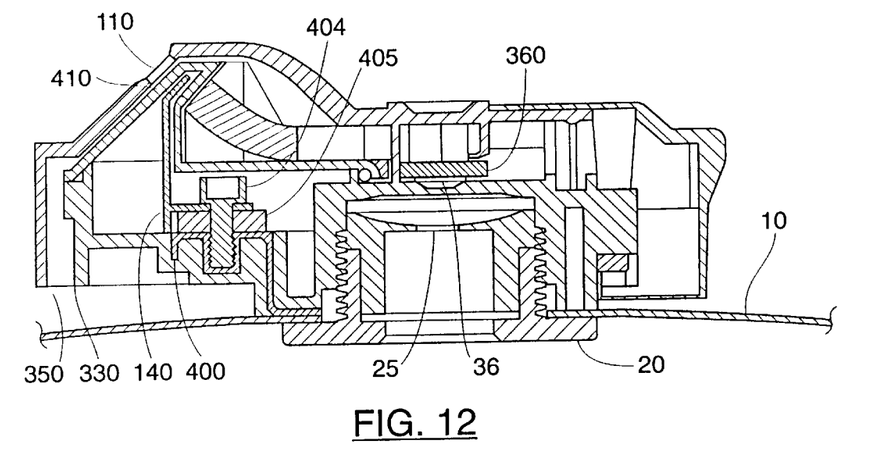
FIG. 12 is a cross sectional view of an assembly of the improved temperature sensing element mounted on top of a cooking vessel.

In this embodiment and now referring to FIG. 11, the temperature sensing element 150 may be comprised of a heat sink 400 that conducts heat energy from the cover 10 to a bimetallic coil 405, which is in turn rotatably coupled to a template 140 for indicating temperature. The heat sink 400 is fashioned of a thin piece of brass or other material similarly conductive to heat and is encased within the body of the outer knob 330 when the outer knob 330 is cast. The heat sink 400 is cast within the outer knob 330 in such a manner that heat may be conducted from the cover through the body of the outer knob 330 without providing a pathway for air or steam to pass through the body of the outer knob 330. A first end 401 of the heat sink 400 is arranged so as to be in direct contact with the cover 10 of the cooking vessel. The other end 402 of the heat sink 400 has formed therein a threaded blind hole 403 that is sized so as to receive a slotted screw 404. The slotted screw 404 has an axial slot running from the threaded end of the screw to near the cap of the screw. The slotted screw 404 is preferably of the same material as the heat sink 400, in this embodiment brass. The second end 402 of the heat sink 400 may further be arranged to be substantially horizontal and flush with the upper surface of the outer knob 330.

The template 140 is fashioned of a transparent material and is comprised of a tab 141 having a hole sized to freely receive the barrel of the slotted screw 404, an upright portion 142 attached to the tab 141 that is essentially a radial section of a hollow cylinder. The radius of rotation of the template 140 is defined by the length of the tab 141 as measured from the center of the hole for receiving the slotted screw 404 to the upright portion 142. The radius of the upright portion 142 is generally the same as the radius of rotation of the template 140. Molded integral to the top of the upright portion 142 of the template 140 is an indicating portion 143 that is essentially a radial section of a hollow cone. The lower diameter of the indicating portion 143 is the same as and coextensive with the diameter of the upright portion 142 and the upper diameter of the indicating portion 143 is somewhat smaller than that of the lower diameter of the indicating portion 143. The indicating portion 143 of the template 140 incorporates the letters L, M, and H (FIG. 8). These letters are intended to indicate the temperature within the cooking vessel, though other means of indicating the temperature within the cooking vessel may be used. Examples of alternate means include various color spots (blue for cold, green for medium, and red for hot), numbers indicating the temperature, or a graduated ramp indicating rising temperatures. These examples are given by way of illustration only and do not constitute a comprehensive list of indicating means that may be used with the template 140.

An assembled temperature sensing element 150 has the slotted screw 404 rotatably received in the hole in the tab 141 of the template 140. The bimetallic coil 405 is mounted upon the slotted screw 404 immediately adjacent to the tab 141 of the template 140. The bimetallic coil 405 is of a well know configuration and has at its center a projection 406 arranged to be received in the slot of the slotted screw 404. When the projection of the bimetallic coil 405 is received in the slot of the slotted screw 404, the coil 405 will be circumjacent to the screw 404. A second projection 407 is located at the outer edge of the bimetallic coil 404. This second projection is arranged to mate with a notch 408 in the tab 141 of the template 140 such that when the temperature of the coil 405 changes, the template will be constrained to rotate about the slotted screw 404 in direct relation to the temperature induced deflections set up in the coil 405. Having assembled the screw 404, template 140, and coil 405, the screw 404 is threaded into the threaded blind hole 403 of the heat sink 400. The screw 404 is threaded into the hole 403 to a point where the template 140 and coil 405 are securely retained and such that the template 140 is in a calibrated position to accurately indicate the temperature. This calibrated position is further defined by an opening 110 formed in the knob cover 350. In order to function, the indicating portion 143 of the template 140 must be immediately adjacent the opening 110 and must present the proper letter or other indicating means to the opening 110 to indicate the actual temperature present within the cooking vessel.

In order to protect the temperature sensing element 150 from corrosion caused by moisture and to prevent the buildup of food substances, a transparent top 410 (FIGS. 9 and 12–14) is fitted over the temperature sensing element 150. Since the temperature indicating device 100 is offset from the waterless cooking means in the knob, the top 410 does not interfere in any way with the functioning of the waterless cooking means. The top 410 is sealed to the outer knob 330 in an airtight manner. The top 410 is also structured so not as to interfere with the rotation of the template 140. The transparency of the top 410 permits the indicating means of the indicating portion 143 to be viewed clearly through the opening 110.

Furthermore, the structure of the top 410 is such that a light means can be mounted immediately behind the indicating means on the template 140, directly across from the opening 110. In this embodiment, the light means is a Y-shaped light pipe 430 (FIG. 9 and 12–13) that conducts light from two openings 120a and 120b formed into the knob cover 350 adjacent the orifice 53. Light entering the openings 120a and 120b enters the light pipe 430 at first and second collection ends 431 and 432. By means of internal reflection, this light is transmitted to the output end 433 of the light pipe 430. Since the output end 433 of the light pipe 430 is located immediately behind the indicating means of the template 140, light exiting the light pipe 430 at the output end 433 passes through the indicating means of the template 140 and exits the knob at opening 110, thereby illuminating the indicating means of the template 140. The "Y" shape of the light pipe 430 of this embodiment allows for the conduction of more light than would a tubular light pipe such as the light pipe 130 of FIG. 1. The Y-shaped light pipe 430 will also continue to illuminate the template 140 if one of the openings 120a or 120b becomes occluded. In order to secure the light pipe 430 in its proper location during assembly, a small circular blind hole 434 (not shown) is molded into one leg of the light pipe 430 such that a hexagonal or octagonal post 435 formed integral to the outer knob 330 can be frictionally received by the hole 434. This hole 434 is carefully located so as not to interfere with the internal reflection necessary to transmit light through the light pipe 430.

Figure 9A:
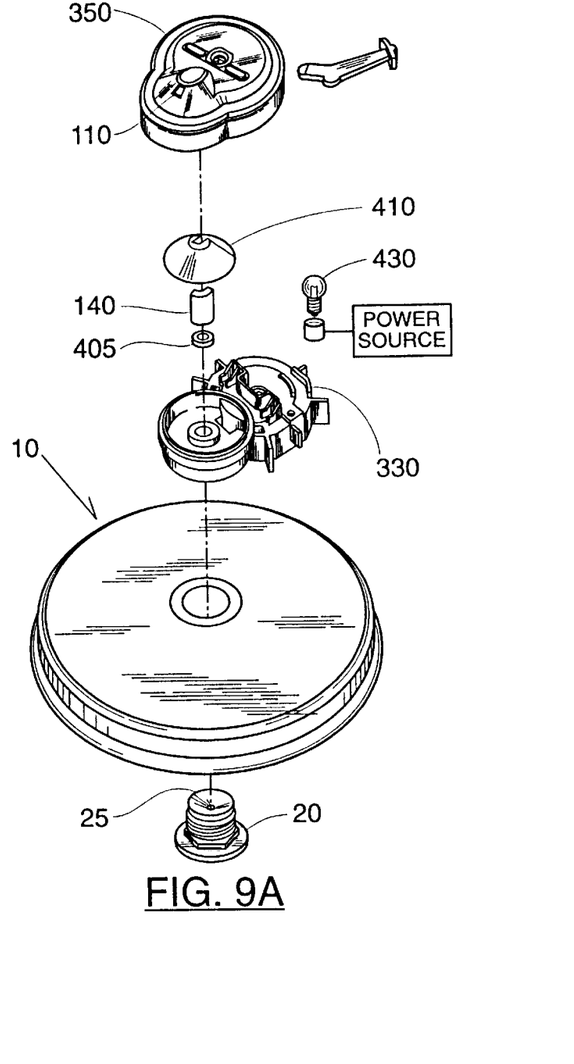
FIG. 9A is an exploded view of the temperature indicating device showing an alternate embodiment light source, seen as a light bulb and power source, incorporated into its cooperating structure.
Figure 9B:
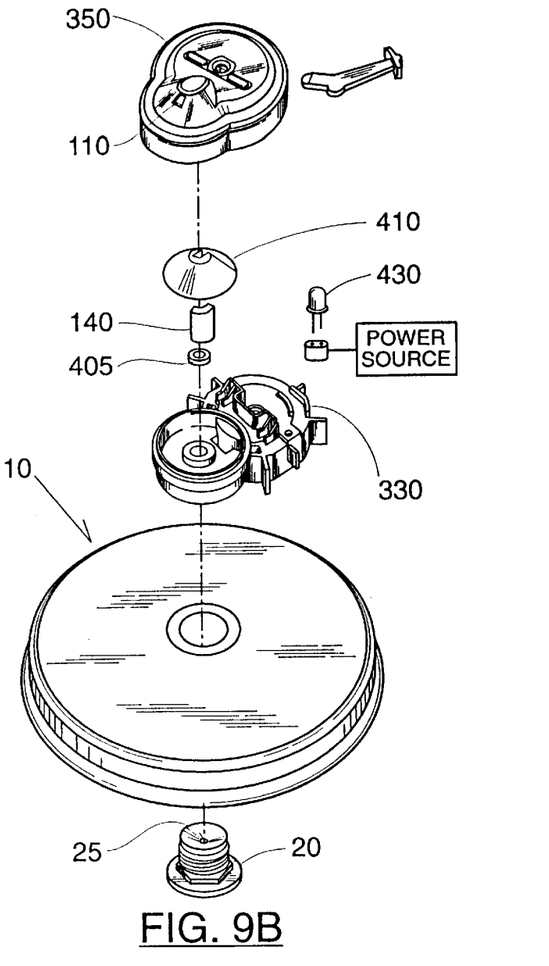
FIG. 9B is an exploded view of the temperature indicating device showing another alternate embodiment light source, seen as a light emitting diode and power source, incorporated into its cooperating structure.
Figure 10:
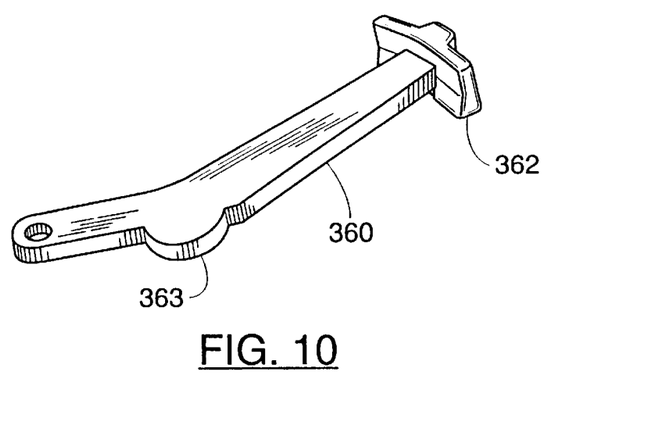
FIG. 10 is an enlarged view of the cantilever slide utilized in the alternate embodiment and particularly for use during waterless cooking.

While the Y-shaped light pipe 430 described above is preferred in this embodiment, it should be understood that other means for illuminating the template 140 could be utilized without straying from the invention herein defined. An alternate means that can be employed to illuminate the template 140 is a light emitting diode (LED) 430b and seen generally in FIG. 9B or as seen in FIG. 9A, other electrically operated illumination device such as a light bulb, 430a coupled to a plurality of solar collectors fastened to the exterior of the upper wall 54 of the knob cover 350. The LED 430b or other electric illumination device would be mounted to the top 410 immediately opposite the opening 110 in the knob cover 350 so as to illuminate template 140.

Another alternate means for illuminating the template 140 would be to use a plurality of mirrors that would be arranged about a suitable configuration of openings in the knob cover 350 so as to direct ambient light towards the opening 110. The light passing out of opening 110 would first pass through the template 140, thereby illuminating it and increasing its visibility through the opening 110. The description of these two alternate means for illuminating the template 140 are given by way of example only and are not to be construed as a complete listing of alternate illuminate means.

An alternate and preferred embodiment of the temperature sensing element 150 (FIG. 13) is also disclosed below. In this preferred embodiment, the second end 402 of the heat sink 400 is formed to maintain an inclined position when molded within the outer knob 330. In the first embodiment of the temperature sensing element 150 described above, the second end 402 of the heat sink 400 was maintained in a generally horizontal position and flush with the outer knob 330. The slotted screw 404 was threaded through the heat sink 400 and into a blind hole 403 formed in the outer knob 330. In this preferred method of arranging the heat sink, the outer knob 330 is molded with an inclined surface 500 having a through hole 501 formed therein. The heat sink 400 is fashioned so as to conform itself to the inclined surface 500 of the outer knob 350. The heat sink 400 also has a hole formed therethrough that is concentric with the through hole 501 of the outer knob 330. The slotted screw 404 of the above described embodiment is in this alternate and preferred embodiment replaced with a slotted pin 502 having a slot 503 (not shown) extending from the end of the barrel of the pin towards the cap 504 of the pin 502 for most of the length of the barrel of the pin 502. The cap 504 of the pin 502 has a diametrically oriented groove 505 (not shown) arranged to accept a screwdriver or similar tool so that the orientation of the pin can be adjusted with regard to the outer knob 330 and more particularly, with regard to the opening 110. Spaced away from the cap 504 of the pin 502 along the barrel of the pin is a circumferential groove 506 (not shown). The distance between the cap 504 and the circumferential groove 506 is at least as great as the thickness of the inclined surface 500. The circumferential groove is arranged to receive a spring clip 507 when the slotted pin 502 is received by the through hole 501. The pin 502 is to be inserted into the through hole 501 so that the barrel of the pin 502 and the circumferential groove 506 are located on the upper side of inclined surface 500. The cap 504 is sized to prevent the pin 502 from being pulled through the through hole 501. When the spring clip 507 is in place, the pin 502 is secured in the through hole 501 and is freely rotatable within the through hole 501.

Figure 13:
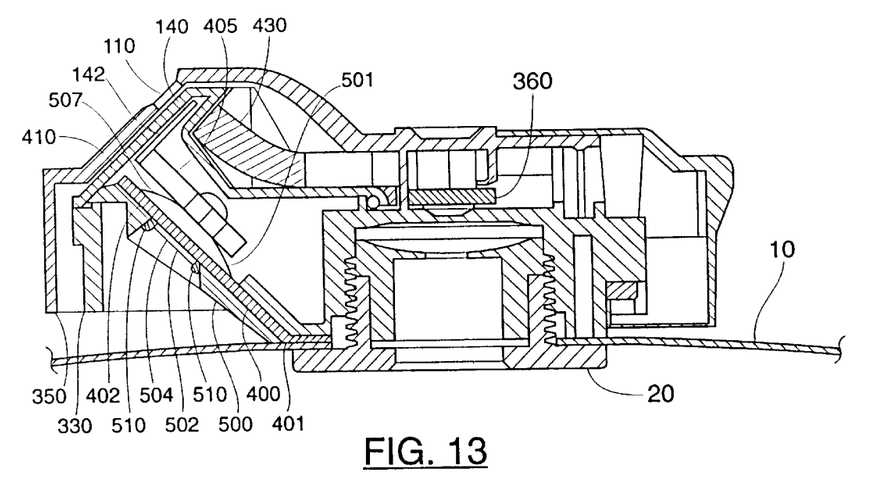
FIG. 13 is a cross sectional view of an assembly of another alternate embodiment featuring a specific configuration of the light illuminating template.
Figure 14:
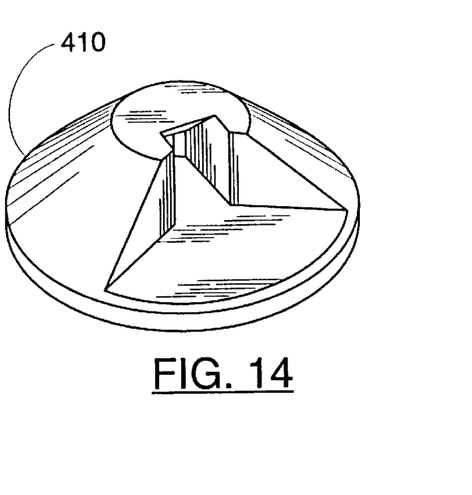
FIG. 14 is an enlarged perspective view of the transparent top.

Once the pin 502 has been clipped into the through hole 501, the bimetallic coil 405, having the same configuration as the above described embodiment, is seated on the pin 502 with the center projection being received by the slot in the barrel of the pin 502.

The template 140 of this embodiment is also modified. In this embodiment the template 140 may or may not have a tab 141. The template 140 may be affixed directly to the bimetallic coil 404 or a tab 141 may be seated on the slotted pin 502 as described above. In either case, the template is constrained to rotate about the pin 502 in direct relation to the temperature induced rotational deflections of the bimetallic coil 404. As can be seen in FIG. 13, the template does not include an indicating portion 143. Instead, the means for indicating temperature are incorporated on the upright portion 142 of the template 140. The upright portion 142 of this embodiment of template 140 rotates essentially parallel to the transparent top 410, with the temperature indicating means interposed between the light pipe 430 or other illuminating means and the opening 110 in the knob cover 350 and visible through opening 110. Using the diametrical groove 505 in the cap 504 of the pin 502 and an appropriate tool such as a screwdriver, the template can be adjusted to a predetermined position calibrated to permit the template 140 to accurately represent the temperature inside the cooking vessel. Once the pin 502 has been rotated to its proper position, the cap 504 is locked into place using an appropriate heat resistant material such as an epoxy adhesive 510. This inclined embodiment offers the benefits of simplifying the manufacture of components such as the template 140 which in this embodiment has fewer complex shapes, and making the calibration of the bimetallic coil 405 more certain by providing a means to positively secure the coil 405 in a particular calibrated position.

Yet another alternate embodiment of the temperature sensing element 150 is herein described. In this embodiment, the indicating means normally present upon template 140 are printed upon a transparent film which is placed over opening 110. Light from the illuminating means, chosen from those illuminating means described above, illuminates the indicating means printed upon the transparent film no affixed over opening 110. Furthermore, in this embodiment, the template 140 is omitted in favor of a slender pointer that may be rotationally mounted upon the slotted screw 404 or slotted pin 502 and actuated by the bimetallic coil as described above, or the pointer may be affixed directly to the second projection of the bimetallic coil 404. The temperature sensing element 150 of this embodiment will be calibrated so that the pointer will be viewable through opening 110 and will point to the appropriate portion of the indicating means of opening 110 so as to indicate the temperature of the cooking vessel 10.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An illuminated accessory for a cooking vessel comprising:
   a housing having at least one opening;
   an illumination means coupled to said housing and arranged to illuminate said at least one opening; and
   a temperature sensing element interposed between said illumination means and at least one opening such that said temperature sensing element is illuminated by said illumination means and is visible through said at least one opening, said temperature sensing element being capable of indicating the temperature of said cooking vessel.

2. The illuminated accessory for a cooking vessel of claim 1 wherein said illumination means comprises:
   a light pipe disposed within said housing so as to receive light from at least one opening in said housing and conduct said light by means of internal reflection to at least one other opening in said housing such that said one other opening is illuminated by said light pipe.

3. The illuminated accessory for a cooking vessel of claim 1 wherein said electrically activated light source is selected from the group consisting of a light emitting diode and a light bulb.

4. The illuminated accessory for a cooking vessel of claim 1 wherein said temperature sensing element is comprised of:
   a heat sink thermally coupled between said cooking vessel and a bimetallic coil such that said bimetallic coil will be rotationally deflected in a known relation to the temperature of said cooking vessel and
   a substantially transparent template rotationally connected to said bimetallic coil such that said template rotates in direct relation to said rotational deflection of said bimetallic coil, said template further including indicating means from relating the temperature of said cooking vessel to a user of said cooking vessel, said template being arranged such that said indicating means are illuminated by said illumination means and viewable through said at least one opening.

5. The illuminated accessory for a cooking vessel of claim 1 wherein said temperature sensing element is comprised of:
   a heat sink thermally coupled between said cooking vessel and a bimetallic coil such that said bimetallic coil will be rotationally deflected in a known relation to the temperature of said cooking vessel;
   a transparent film having indicating means for relating the temperature of said cooking vessel to a user of said cooking vessel printed thereon, said transparent film being affixed over said at least one opening such that said indicating means are viewable in said at least on opening; and
   a pointer coupled to said bimetallic coil, said pointer constrained to move in direct relation to said rotational deflection of said bimetallic coil, a free end of said pointer being arranged to move between said indicating means of said at least one opening and said illumination means, said free end of said pointer pointing to a portion of said indicating means indicative of the temperature of said cooking vessel, said free end of said pointer further being viewable in said at least one opening.

6. The illuminated accessory for a cooking vessel of claim 2 wherein said light pipe is comprised of one of a group consisting of fiber optic material, acrylic material, polycarbonate material, and glass material.

7. The illuminated accessory for a cooking vessel of claim 1 wherein said housing is configured to replace an existing accessory for a cooking vessel not incorporating an illumination means.

8. In an audible signal valve knob for a cooking vessel comprising means for generating an audible tone and means for engaging waterless cooking, the improvement comprising:
   an illumination means coupled to a housing of said audible signal valve, said housing having at least one opening, said illumination means arranged to illuminate said at least one opening and
   a temperature sensing element interposed between said illumination means and said at least one opening such that said temperature sensing element is illuminated by said illumination means and is visible through said at least one opening, said temperature sensing element being capable of indicating the temperature of said cooking vessel.

9. The improvement of claim 8 wherein said illumination means comprises:
   a light pipe disposed within said housing so as to receive light from said at least one opening in said housing and conduct said light by means of internal reflection to at least one other opening in said housing such that said one other opening is illuminated by said light pipe.

10. The improvement of claim 8 wherein said electrically activated light source is selected from the group consisting of a light emitting diode and a light bulb.

11. The improvement of claim 8 wherein said temperature sensing element is comprised of:
   a heat sink thermally coupled between said cooking vessel and a bimetallic coil such that said bimetallic coil will be rotationally deflected in relation to the temperature of said cooking vessel and
   a substantially transparent template rotationally connected to said bimetallic coil such that said template rotates in direct relation to said rotational deflection of said bimetallic coil, said template further including indicating means from relating the temperature of said cooking vessel to a user of said cooking vessel, said template being arranged such that said indicating means are illuminated by said illumination means and viewable through said at least one opening.

12. The improvement of claim 8 wherein said temperature sensing element is comprised of:

a heat sink thermally coupled between said cooking vessel and a bimetallic coil such that said bimetallic coil will be rotationally deflected in relation to the temperature of said cooking vessel;

a transparent film having indicating means for relating the temperature of said cooking vessel to a user of said cooking vessel printed thereon, said transparent film being affixed over said at least one opening such that said indicating means are viewable in said at least on opening; and a pointer coupled to said bimetallic coil, said pointer constrained to move in direct relation to said rotational deflection of said bimetallic coil, a free end of said pointer being arranged to move between said indicating means of said at least one opening and said illumination means, said free end of said pointer pointing to a portion of said indicating means indicative of the temperature of said cooking vessel, said free end of said pointer further being viewable in said at least one opening.

13. The improvement of claim 9 wherein said light pipe is fabricated from a material selected from a group comprised of fiber optic material, acrylic material, polycarbonate material, and glass material.

14. The improved audible signal valve knob of claim 8 wherein said knob is configured to replace an existing accessory for a cooking vessel.

15. A process for monitoring the temperature of food in a cooking vessel having an audible signal valve knob comprising a knob base structure projecting through said cooking vessel, an outer knob structure abutting said cooking vessel and removably secured to said knob base structure, a knob cover structure removably secured to said outer knob structure and having an opening formed therein, and an illuminated temperature-indicating device, the process comprising:

applying heat to said cooking vessel;

observing the illuminated temperature-indicating device;

reducing the heat applied to said cooking vessel when said illuminated temperature-indicating device indicates a predetermined temperature range.

\* \* \* \* \*